United States Patent [19]

Khan et al.

[11] Patent Number: 4,963,295
[45] Date of Patent: Oct. 16, 1990

[54] PROCESS FOR THE PREPARATION OF CLAY LOADED METAL COMPLEXES CATALYST AND A PROCESS FOR THE HYDROGENATION OF OILS USING THE CATALYST SO PREPARED

[75] Inventors: Mirza M. T. Khan; M. R. H. Siddiqui, both of Bhavnagar, India

[73] Assignee: Council of Scientific and Industrial Research, New Delhi, India

[21] Appl. No.: 317,918

[22] Filed: Mar. 2, 1989

Related U.S. Application Data

[62] Division of Ser. No. 114,118, Oct. 27, 1987, abandoned.

[51] Int. Cl.$^5$ .............................................. C11C 3/12
[52] U.S. Cl. ..................................... 260/409; 502/62; 208/143
[58] Field of Search .................... 502/62, 154, 162; 260/409; 208/143

[56] References Cited

U.S. PATENT DOCUMENTS

| | | | |
|---|---|---|---|
| 3,493,617 | 2/1970 | Saryne et al. | 502/162 X |
| 3,625,755 | 12/1971 | Potrafke | 502/162 X |
| 3,658,866 | 4/1972 | Tsuji et al. | 502/162 X |
| 3,798,278 | 3/1974 | Jung | 502/162 X |
| 3,929,849 | 12/1975 | Oswald | 502/62 X |

Primary Examiner—Patrick P. Garvin
Attorney, Agent, or Firm—Lester Horwitz

[57] ABSTRACT

The process disclosed is for the preparation of clay loaded metal complex hydrogenation catalyst which is particularly suitable for the hydrogenation of oils and other unsaturated compounds such as Jojoba oil and castor oil. In the process, a platinum group metal complex $MX_n$ wherein M is a platinum group metal, X is a halide and n is 1,2,3 or 4 is refluxed with a donor substituted phosphine or arsine ligand and clay in the presence of an organic solvent. The solution is precipitated and dried. The catalyst so obtained is cheap.

6 Claims, No Drawings

PROCESS FOR THE PREPARATION OF CLAY LOADED METAL COMPLEXES CATALYST AND A PROCESS FOR THE HYDROGENATION OF OILS USING THE CATALYST SO PREPARED

This is a division of co-pending application Ser. No. 114,118, filed on Oct. 27, 1987, now abadoned.

This invention relates to a process for the preparation of clay loaded metal complex hydrogenation catalysts. The catalysts are useful for the hydrogenation of oils and other unsaturated compounds particularly of Jojoba oil and Castor Oil which are of vital importance in cosmetics and as lubricants. Hydrogentation of these oils is normally carried out using heterogeneous catalysts which require high pressure and temperature.

Homogeneous catalysts have received considerable attention in recent years because of their capability to perform selective reactions with high efficiency and milder conditions, but the main disadvantage has been the separation of the catalyst from the product. The heterogeneous catalysts require rigorous conditions and are not selective. To solve these problems, a new class of catalysts, heterogenised homogeneous catalysts, have been discovered which has provided a new flexibility in the design of chemicals and chemical process. In such catalysts, a homogeneous reaction can proceed on a heterogeneous phase. Polymers, silica and alumina are conventional supports for homogeneous catalysts, but a new group of substances i.e. clays have imparted a new dimension to the concept of heterogenised homogeneous catalysis. The activity and selectivity of the catalysts can be remarkably enhanced by clays. Very recently the importance of clay minerals which are cheap and widely available has been amplified for their fascinating catalytic properties. Clay minerals belong to phyllosilicates. The principal building elements of clay minerals are two dimensional arrays of aluminum-oxygen-hydroxyl octahedra and silicon. Oxygen tetrahedra stacked above are another along C direction. In smectite group of clay minerals (montmorillonite being one of them) for every Al-octahedra there are two sitetrahedra followed by a water layer. In most of the cases, Si and Al get replaced by lower valent ions thereby creating a charge deficiency which is normally translated to water layers. Due to such replacement clay minerals possess cation exchange properties. The imbided guest ion can be on the surface but the water layer accommodates most of them. The swelling layer lattice silicates have metal ions between the silicate sheets, which are easily exchangeable with organic and inorganic cations by a simple ion exchange method. The metal ions can be replaced even with bulky cations including cationic metal chelate complexes because the other layer spacing is expandable. Making use of the layer lattice silicates with these properties, homogeneous metal complex catalysts are expected to be immobilized in the interlayer region.

For a complex to be catalytically active, it should form a reactive intermediate which should be thermodynamically stable enough in solution and also kinetically labile to form the product. This can be achieved by maintaining a fine balance between $\eta$-acidity and $\sigma$-basicity of the complex which can be tailored by making use of substituent phosphines and arsines ($\eta$-acceptors) with $\sigma$-donors. The catalytic activity in part also depends on the ease of change in the oxidation state of the metal ion. So in effect best catalytic activity can be produced by selecting metal ions which can easily change the oxidation status and which are coordinated by ligands with the property of maintaining a fine balance between $\sigma$-basicity and $\eta$-acidity.

Keeping in view the above factor, we have developed some new catalysts using platinum group metals which can undergo change in oxidation state easily and a fine balance of $\sigma$-basicity and $\eta$-acidity is maintained around the metal ion by using phosphines and arsines that is to say, mixed donor ligand system is used and also a few mixed ligand catalysts are developed for hydrogenation of oils and other unsaturated compounds. Some of these metal complexes (catalysts) are cationic and some are neutral. For loading of metal complexes either a cationic form of metal complex has been used or the ligand was loaded first in the form of a cation. We have observed that even neutral complexes (catalysts) prepared according to the process of the invention readily undergo intercalation under the conditions employed by us to form cationic metal complex inside the clay matrix.

The complexes (catalysts) according to the process of this invention are prepared following reactions represented by the equation.

  (1)

  (2)

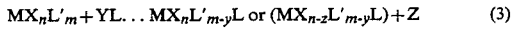  (3)

where
M = platinum group Metal
X = Halide
Z = 0–4
n = number of halide atoms from 1 to 3
m + n = the coordination number of M''
y = number of ligand atoms from 1 to 3
L = $\sigma$-donor substituted phosphine or arsine
L' = other ligands The process according to the present invention has the following advantages:
1. Hydrogenation at room temperature and one atmospheric pressure.
2. Easy separation of the product from catalyst as the clay can be simply filtered out after hydrogenation.
3. Cheaper cost of the catalyst.

According to the present invention, there is provided a process for the preparation of clay loaded metal complex hydrogenation catalyst which comprises refluxing a platinum group metal complex of the formula $MX_n$, wherein M is a platinum group metal, X is a halide and n is 1,2,3 or 4 with a donor substituted phosphine or arsine ligand and clay in the presence of an organic solvent, precipitating the solution, drying under vacuum and, if required, reprecipitating for purification.

According to another feature of the invention, the solvent is selected from methanol, acetone and n-hexane.

According to yet another feature of the invention, the refluxing is done for a period of about 4–6 hours in an inert atmosphere.

According to another feature of the invention, a dilute solution of the platinum group metal complex is added to the clays over a period of about 1–2 hours in an inert atmosphere.

According to a further feature of the invention, the reprecipitation is done with dichloromethanol acid n-hexane.

All the platinum group metal complexes have been found to interact readily with Na+ exchanged montmorillonite clay in cationic form. The cationic complexes undergo intercalation as such but the neutral complexes undergo intercalation as cations. The loading was effected after the removal of surface water from clay.

For loading of the metal complexes on clay, Na+ exchanged montmorillonite clay is used which is activated after removing the surface water of the clay by heating it to a certain temperature and it is then allowed to cool in a dessicator over $P_2O_5$.

Weighed amount of clay is taken in a three necked round bottom flask with an inlet tube effecting inert atmosphere, a condensor and a pressure equalising dropping funnel are fitted on the other two necks. The platinum group metal complex is weighed and a dilute solution of the complex is made in appropriate solvent and this solution is slowly added to clay through pressure equalising dropping funnel over a period of about 1-2 hours in an inert atmosphere. The solution is then refluxed in an inert atmosphere for a period of about 6-8 hours, after which the solvent is removed by filtration and the clay loaded metal complex catalyst is washed several times with the solvent and dried under vacuo. The loading is of the order of about 10-50 mg/gram of the clay.

The complexes prepared by the process of this present invention have been characterised by elemental analysis, conductivity data, T.R., UV-Vis, multinuclear NMR, and EPR spectroscopy (EPR and magnetic susceptibility is used only when the platinum group metal is paramagnetic).

A process for the hydrogenation of oils using the catalyst prepared by the process of the present invention is effected at ambient temperature of about 30°-40° C. and about one atmospheric pressure of hydrogen. Further, the product can be separated from the catalyst easily by simple filtration and what is more the catalyst is also cheap.

The catalyst is introduced in a reaction cell and the air in the cell is completely displaced by repeating the process of evacuating and flushing several times with hydrogen at a particular pressure. This is done to ensure that a complete hydrogen atmosphere prevails in the reaction system. The oil to be hydrogenated is taken only with a solvent and is introduced in the reaction cell rapidly, so as to maintain the volume constant throughout the process. The solvent employed may be 1,4 dioxan, benzene, ethanol or mixtures thereof. Sufficient time was given for the catalyst and the reaction mixture to equilibrate with hydrogen. The reaction mixture is rapidly stirred in order to saturate the catalyst and solution with respect to a blank is simultaneously run under the same conditions of temperature, pressure and volume.

The absorption of hydrogen was measured in a glass manometric apparatus provided with leak proof Springham high vacuum stop cocks. It consisted of a burette and a manometer which was filled with the indicator solution. The solution and the catalyst in the cell were stirred constantly by means of a magnetic stirrer. The temperature of the reaction mixture and the blank were maintained constant by circulating water at a required temperature through the water jacketted glass cell.

The ratio of the catalyst:substrate was varied from 1:100 to 1:500 and the hydrogen pressure was in the range of about 0.4 to 1 atmosphere. The temperature range was about 20° to 45° C.

1,4, Dioxan, Benzene or Benzene:ethanol mixture was used as a solvent in all the hydrogenation studies. Hydrogen gas from a cylinder was purified by pressing first through a saturated potassium permanganate solution to free it from olefins and then through calcium chloride and finally through silica gel traps. Indicator solution was prepared by using 1% sodium chloride solution to which a drop of methyl orange was added to render the volume change clearly visible. This indicator solution was used to fill the manometer and the burette for measuring the changes in volume during the hydrogenation reactions.

The absorption of hydrogen is measured manometrically by noting the change in the levels of the indicator solution in the measuring burette at suitable intervals of time. The stirrer is operated at the gas liquid interface in a manner that the rate of dissolution of the gas is much faster than the rate of absorption by the catalyst. The conversion of the rate of consumption of oil is made by the stoichiometric relationship $$\frac{-d(H_2)}{dt} = \frac{-d(oil)}{dt}$$

It is observed that benzene:ethanol mixture gives better results and the increase of temperature increases the rate of reaction within the range of temperatures studied. The rate of stirring does not have a very pronounced effect on the rate of the reaction and one atmosphere of hydrogen is sufficient to hydrogenate the oils studied.

The catalyst can be filtered off as it is solid and the solvent can be removed by distillation to get the product.

The catalyst has been recycled 50 times and there is no significant change in its catalytic activity.

We claim:

1. A process for the hydrogenation of oil which comprises reacting a mixture of said oil and a solvent with hydrogen gas at a temperature of about 20°-45° C. (ambient temperature) in the presence of a clay loaded metal catalyst prepared by refluxing a platinum group metal complex of the formula $MX_{n3}$ wherein M is a platinum group metal, X is halide and n is 1,2,3 or 4 with a stigma donor-substituted phosphine or arsine ligand and clay in the presence of an organic solvent, precipitating the solution, drying under vacuum and, if required, reprecipitating for purification.

2. A process as claimed in claim 1 wherein the solvent used is selected from 1,4 dioxan, benzene, ethanol or mixtures thereof.

3. A process as claimed in claim 2 wherein the solvent used is a mixture of benzene and ethanol.

4. A process as claimed in claim 2 wherein the ratio of catalyst to substrate is varied from 1:100 to 1:500.

5. A process as claimed in claim 4 wherein the hydrogen pressure is in the range of about 0.4 to 1 atmosphere.

6. A process for hydrogenation of oil as claimed in claim 1 wherein said oil is Jojoba Oil or Castor Oil.

* * * * *